July 1, 1958 V. J. TERRY ET AL 2,841,701

DIVERSITY RADIO TELEGRAPH SYSTEM

Filed May 27, 1953 3 Sheets-Sheet 1

Inventor
V. TERRY - T. HARGREAVES
H. T. PRIOR
By Philip M. Bolton
Attorney

Inventor
V. TERRY - T. HARGREAVES -
H. T. PRIOR
By Philip M. Bolton
Attorney

July 1, 1958 V. J. TERRY ET AL 2,841,701

DIVERSITY RADIO TELEGRAPH SYSTEM

Filed May 27, 1953 3 Sheets-Sheet 3

Inventor
V. TERRY - T. HARGREAVES
H. T. PRIOR
By Philip M. Bolton
Attorney

United States Patent Office 2,841,701
Patented July 1, 1958

2,841,701

DIVERSITY RADIO TELEGRAPH SYSTEM

Victor John Terry, Thomas Frederick Stanley Hargreaves, and Hector Thomas Prior, London, England, assignors to International Standard Electric Corporation, New York, N. Y.

Application May 27, 1953, Serial No. 357,738

Claims priority, application Great Britain June 17, 1952

2 Claims. (Cl. 250—20)

Figure 1A:
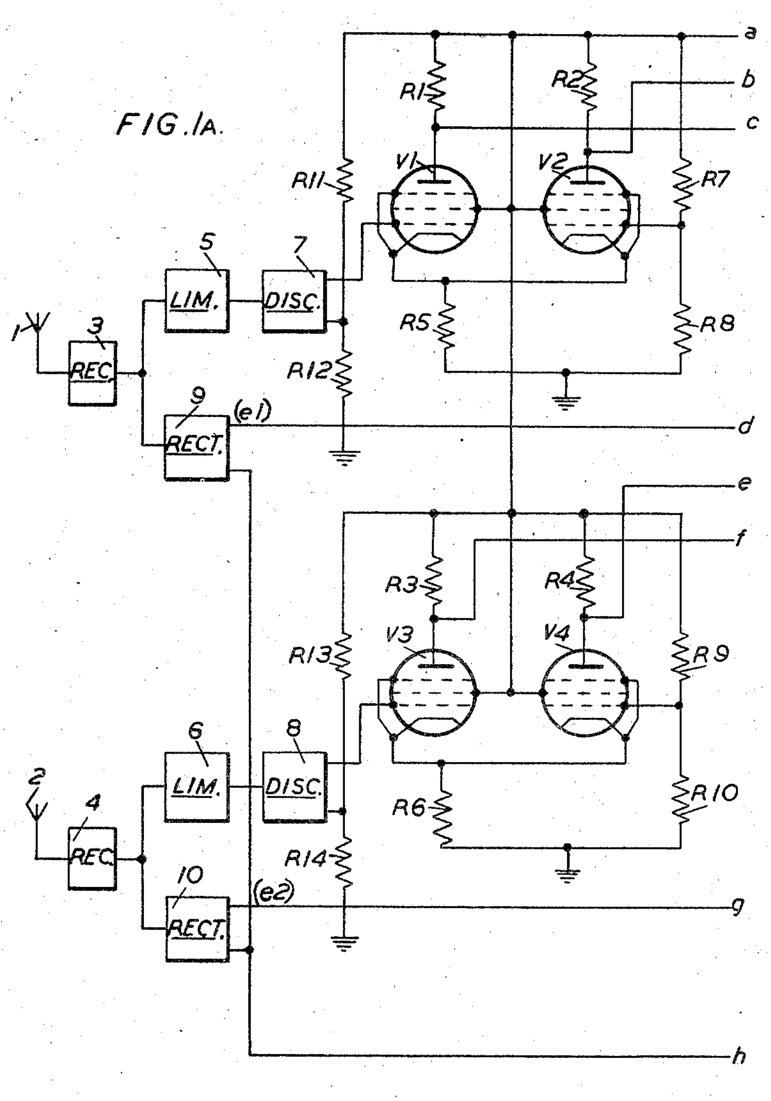

This invention relates to receiving systems for frequency-shift signalling. In particular it relates to diversity receivers for frequency shift telegraph signals.

In frequency shift signalling, carrier wave energy is transmitted by successive keying at two different frequencies, one of which corresponds to the marking condition and the other to the spacing condition.

In order to minimise the effect of interference during transmission of the signals, it is common practice to employ either space or frequency diversity transmission. In space diversity transmission, the signals are transmitted over two or more paths separated in space and received at a corresponding number of antennae mutually spaced apart. In frequency diversity transmission, the signals are transmitted over two or more paths separated in the frequency spectrum.

It is a characteristic of most diversity combining arrangements that the switchover from one reception to another takes place very rapidly so that two or more receptions are never mixed in the utilised output. This is an essential feature in radio-telephony since the difference in delay times in alternate transmission paths may be equivalent to several complete cycles of the higher speech components. Mixture of receptions under these conditions may result in some components being added in phase and others being added out of phase with consequent serious distortion.

In the case of comparatively low-speed telegraph transmissions in which one element period is appreciably longer than the greatest differences in delay times which can occur, this difficulty does not arise and it may actually prove an advantage to avoid rapid switching from one telegraph signal reception to another for the following reason.

As has already been mentioned, it frequently occurs that one reception in a diversity system is delayed relative to another. This relative delay may amount to several milliseconds. With rapid switching devices this delay is in effect added momentarily to any existing telegraph distortion every time switching takes place.

This effect is avoided or at least reduced by means of the present invention.

In a diversity receiving system according to the invention, voltages representative of the modulations of the signals received over respective transmission paths are normally directly combined by simple addition so that each of the received signals can contribute to the output of the required information.

When the discrepancy between the strengths of the signals exceeds a certain amount it has been found that such combination shows no advantage or even a disadvantage over non-combination and accordingly automatic means is provided for temporarily rendering ineffective the received signals in the weaker (or weakest) path.

An embodiment of the invention will now be described with reference to the accompanying drawings of which:

Fig. 1, which is divided into two halves A and B, shows partly in block schematic a circuit according to the invention for receiving frequency-modulated telegraph signals which have been transmitted over two paths separated in space (i. e. a dual space-diversity system), and Fig. 2 comprises various curves which will be explained in the course of the description.

Before commencing the description it is pointed out that, in order to facilitate the correct mutual relating of the two halves of Fig. 1, the interconnecting leads have been similarly positioned and lettered at the adjacent edges of the two sheets.

Referring to Fig. 1A, the signals received at the spaced antennae 1 and 2 are applied to respective circuit paths having similar components and charactristics. Only one of these paths will be described but where reference is made to any component the designation will be followed in the text by the bracketed designation of the corresponding component in the other path.

The frequency-modulated telegraph signals picked up by antenna 1 (2) are passed to a conventional receiver 3 (4) having the usual means for amplifying the received signals.

The signals emanating from receiver 3 (4) have their amplitudes brought to a common level in a limiter 5 (6) before being applied to a discriminator 7 (8). The discriminator output is in the form of double-current D. C. telegraph signals of polarity corresponding to the frequency-modulations of the originally received signal wave and these are applied to control an electronic relay whose construction and operation will now be explained.

The electronic relay comprises two thermionic valves V1 and V2 (V3 and V4). In the embodiment shown here, the two valves are pentodes but triodes could be used instead if preferred. The anodes of valves V1 and V2 (V3 and V4) are supplied with H. T. potential through respective dropping resistors R1 and R2 (R3 and R4) but both cathodes are connected to earth through a common load resistor R5 (R6). The connections to the screen and suppressor grid will be apparent from the drawing.

The valve V2 (V4) has its control grid maintained at a reasonably constant positive potential by virtue of the potentiometer formed by resistors R7 and R8 (R9 and R10) across the H. T. supply.

The other valve V1 (V3) has its control grid connected through the discriminator 7 (8) to a similar potentiometer consisting of resistors R11 and R12 (R13 and R14).

The operation is as follows. During the receipt of a mark signal a negative bias voltage is applied to the control grid of the valve V1 (V3) which is sufficient to stop this valve conducting. At the same time the other valve V2 (V4) conducts by virtue of the positive voltage applied to its control grid.

When a space signal is received, a considerable positive potential is applied to the control grid of valve V1 (V3) from discriminator 7 (8). This causes this valve to become conducting and the cathode potentials of both valves rise by virtue of the common cathode load resistor R5 (R6). When the cathode of the valve V2 (V4) reaches its new level, the steady voltage on the control grid of this valve is not longer sufficiently positive to allow conduction and this valve is cut off.

It will be apparent from the foregoing that the receipt of mark and space signals is signified by the respective condition of valves V2 and V1 (V4 and V3). When valve V2 (V4) conducts, its anode potential falls by virtue of the current passing through resistor R2 (R4). Similarly when valve V1 (V3) conducts, its anode potential falls by virtue of the current passing through resistor R1 (R3). Thus the anode of the valve V1 (V3) will go more positive during mark signals and the anode of valve V2 (V4) will go more positive during space signals.

The anode of valve V1 (V3) is connected to the screen grid of a pentode valve V5 (V7) (Fig. 1B) via a resistance-capacity network R15.R16.C1 (R17.R18.C2) whose purpose will be explained later.

The anode of valve V2 (V4) is connected to the screen grid of a pentode valve V6 (V8) (Fig. 1B) via a resistance-capacity network R19.R20.C3 (R21.R22.C4).

The anodes of valves V5 and V6 (V7 and V8) are connected to the H. T. supply via respective load resistors R23 and R24 (R25 and R26) and their cathodes are connected to earth via respective load resistors R27 and R28 (R29 and R30).

During a mark signal, the rise in potential at the anode of valve V1 (V3) causes valve V5 (V7) to conduct and during a space signal, the rise in potential at the anode of valve V2 (V4) causes V6 (V8) to conduct.

Conversely, during a mark signal the non-conductance of valve V6 (V8) causes a rise in potential at its anode and during a space signal, the non-conductance of valve V5 (V7) causes a rise in potential at the anode of this valve.

The rise in potential at the anode of valve V6 (V8) during a mark signal is applied via a resistor R31 (R32) and a resistor R33 to the control grid of a pentode valve V9. Resistors R31 (R32) and R34 form a potentiometer between the anode of valve V6 (V8) and earth.

In a similar manner, the rise in potential at the anode of valve V5 (V7) during a space signal is applied via a resistor R35 (R36) and a resistor R37 to the control grid of a pentode valve V10. Resistors R35 (R36) and R38 form a potentiometer between the anode of valve V5 (V7) and earth.

The valves V9 and V10 form an electronic relay similar to that comprising valves V1 and V2 in Fig. 1A. The cathodes of valves V9 and V10 are connected to earth via a common load resistor R39. Their anodes are supplied with H. T. potential via the mark and space windings MW and SW of a telegraph relay controlling a changeover contact CO.

During a mark signal, the increased potential applied to the control grid of valve V9 from the anode(s) of V6 and V8 causes valve V9 to conduct and pass current through the mark winding MW of the telegraph relay. This holds contacts CO on to the mark side M. It is assumed that this contact is connected in an outgoing telegraph line (not shown).

During a space signal, the increased potential applied to the control grid of valve V10 from the anode(s) of V5 and V7 causes valve V10 to conduct and pass current through the space winding SW of the telegraph relay. This changes over contact CO on to the spacing side S.

The voltages developed across the anode load resistors R24 and R26 during a mark period may be regarded as being directly added across resistor R34. Similarly, the voltages developed across the anode load resistors R23 and R25 during a space period may be regarded as being directly added across resistor R38. Thus it will be apparent that unlike previously known diversity receiving systems, both the received signals contribute simultaneously to the signal output. The purpose of the shaping networks R15.R16.C1 . . . R21.R22.C4 is to enhance the value of such combining of the received signals as will now be explained.

It has already been mentioned that the received signals are brought to a common amplitude level in the limiter 5 (6) before being applied to the discriminator 7 (8). The output of the discriminator will thus be in the form of positive or negative potentials of substantially constant amplitude irrespective of any difference in the amplitudes of the received signals. If, however, there is any displacement in time between the received signals this will persist in the output of the discriminator and in the subsequent portions of the circuit.

Figure 2:
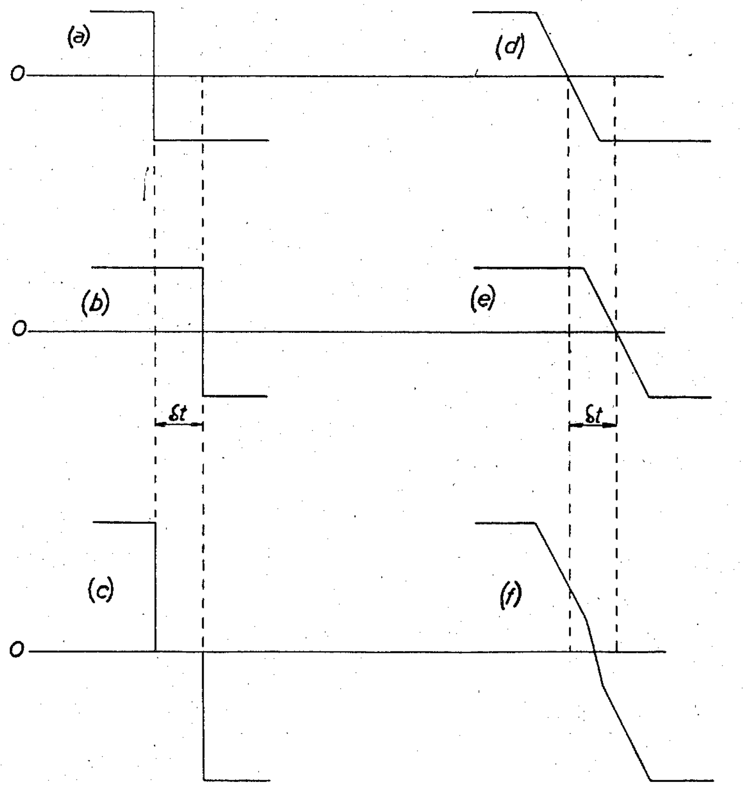

Referring to Fig. 2, it is assumed that a mark-to-space transition as reproduced by the electronic relay V1.V2 is substantially of the form shown in "curve" (*a*). Similarly, "curve" (*b*) may be taken to represent a mark to space transition as reproduced by the electronic relay V3.V4. It will be observed that curves (*a*) and (*b*) are exactly similar except for a time or phase displacement $\delta t$. This time displacement corresponds to the difference in time between the incidence of the signals at antenna 1 and 2 respectively, this difference being attributable to the vagaries of one transmitting path.

If curves (*a*) and (*b*) are directly added they yield a curve of the form shown in line (*c*). It will be noticed that there is no clear instant of transition since during the time $\delta t$ the potential is neither positive nor negative with respect to the zero line. This means that during the time $\delta t$ the output relay is in an unstable state and little if and advantage has been gained by combining curves (*a*) and (*b*).

In the circuit shown in Fig. 1 the signals emanating from the electronic relays V1, V2, and V3, V4 are passed through the afore-mentioned shaping networks of resistors and capacitors. These convert the curves (*a*) and (*b*) into the forms shown at (*d*) and (*e*) respectively. It will be apparent that the time displacement $\delta t$ is present as before.

If curves (*d*) and (*e*) are added as in the present embodiment, the resultant curve is of the form shown at (*f*) in Fig. 2. Here there is no uncertainty as to the transition point which is the mean between the transition points of curves (*d*) and (*e*). Thus both the received signals contribute to the establishing of the signal instant and, generally speaking, this gives a nearer approximation to the correct result than if only one received signal were considered.

It has been found that, provided the strength of reception in one path does not fall below a certain fraction of the strength of that in the other path, signal combination of the type just described shows an advantage over the use of only the stronger signal. This advantage ranges from 3 decibels when the received signal strengths are equal to zero when the weaker signal has a strength equal to 0.576 of that of the stronger signal. If the strength of the signal in the weaker path falls any lower, combination of the two signals shows a disadvantage over the sole use of the stronger signal. It is therefore arranged that if the level of one path falls to less than 0.576 or 57.6% of the level of the other path, the information in the weaker path is ignored.

Figure 1B:
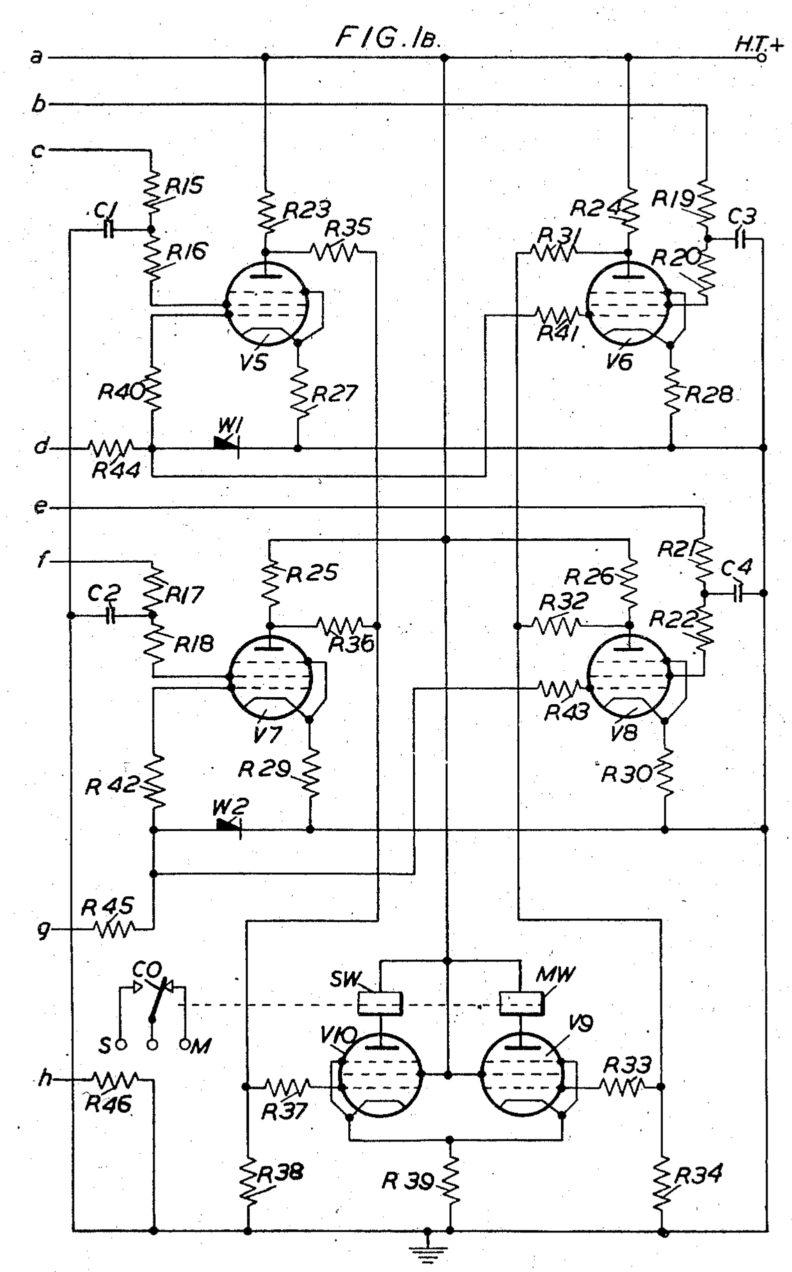

This is achieved by cutting off either pair of valves V5 and V6 or V7 and V8 whichever pair is connected to the path receiving the weaker signal. Referring to Fig. 1B, the control grids of valves V5 and V6 (V7 and V8) are normally connected to earth over respective resistors R40 and R41 (R42 and R43) and rectifier W1 (W2).

Referring back to Fig. 1A, the received signals after passing through receiver 3 (4), in addition to passing to limiter 5 (6) are rectified in a rectifier stage 9 (10). The output of this rectifier stage is a direct-current control voltage which will be referred to as $e1$ ($e2$). The value of $e1$ ($e2$) will be proportional to the amplitude of the carrier waves received at antenna 1 (2).

The positive output terminal of rectifier 9 (10) is connected via a resistor R44 (R45) and rectifier W1 (W2) to earth and the negative output terminal is connected to earth via a resistor R46.

In order to understand the working of this part of the circuit it will first be assumed that the incoming signal strengths at antennae 1 and 2 are in the proportion of 1:0.576 consequently $e2=0.576\ e1$. It will be understood that it is at this stage that valves V7 and V8 must be on the point of being cut off.

The control grids of these two valves will be at the potential $e2$ by virtue of the resistors R45, R42 and R43 connecting them to rectifier 10.

The control voltage $e1$ from rectifier 9 will cause a current to flow through resistor R44, rectifier W1 in the forward direction, and through resistor R46 back to rectifier 9.

Neglecting the small forward resistance of rectifier W1 a portion of $e1$ will be dropped across resistor R44 and the remainder across resistor R46. By making the values of R44 and R46 in the proportions (1−0.576) : 0.576 it will be clear from Ohm's law that the voltage at the junction between resistors R44 and R46 will be 0.576 $e1$. This is the potential which is applied to the cathodes of valves V7 and V8 via resistors R29 and R30 respectively and it is equal to the potential which is applied to the control grids of these valves namely $e2$. The valves V7 and V8 are arranged to conduct in these circumstances.

If $e1$ remains constant but $e2$ increases, rectifier W2 conducts so that the control grids of valves V7 and V8 are connected to the junction of resistors R44 and R46, and are thus held at a value of 0.576 $e1$ and the valves continue to conduct.

If $e1$ remains constant but $e2$ decreases, the voltages on the control grids of valves V7 and V8 decrease by the same amount but the cathode voltage remains as before at 0.576 $e1$. This cathode potential has no effect on the grid potential owing to the non-conductance of rectifier W2 in the backward direction. Thus the grid potential falls below the cathode potential so simulating the application of a negative grid bias and both valves are effectively cut off.

It will be clear that if resistor R45 is chosen equal to resistor R44 then valves V5 and V6 will be similarly cut off when $e1$ falls to 0.576 $e2$.

The arrangements described may be applied to other diversity receiving systems e. g. to triple-diversity reception. In the latter case, another complete set of receiving equipment is, of course, required for the third path and the outputs of three pairs of electronic relays (such as V5 and V6) are combined in the method described in relation to Fig. 1B.

It has been found that when the invention is applied to a triple-diversity receiving system, any path must be switched off when its level falls to half that of the strongest path. It can be shown that to achieve this, resistors R44 and R45 together with the corresponding resistor in the third path must be equal to each other and to the common resistor R46.

While the principles of the invention have been described above in connection with specific embodiments, and particular modifications thereof, it is to be clearly understood that this description is made only by way of example and not as a limitation on the scope of the invention.

What we claim is:

1. Diversity receiving system for frequency-shift telegraph signals comprising means for separately receiving signals transmitted over a plurality of different paths, a plurality of pairs of thermionic amplifier valves, one pair for each path, each valve comprising at least cathode, control grid and anode electrodes, means for separately deriving from said pairs of valves voltage waves representative of the frequency modulations of the received signals, means for directly adding said derived voltage waves to produce a resultant voltage wave, means for applying to the control grids of that pair of valves which is associated with the path over which signals are weaker a voltage dependent on the amplitude of the weaker signals, means for applying to the cathodes of said last-mentioned pair of valves a voltage which is dependent on the amplitude of the stronger signals, rectifier decoupling means connected between said control grids and cathodes and so poled as to permit said control grid potentials to fall below the cathode potentials by an amount which is sufficient to prevent conduction through said valves, and an output relay device responsive to said resultant voltage wave.

2. Diversity receiving system according to claim 1, wherein said valves each comprise an additional grid and further comprising individual wave shaping networks and means for applying received signal waves to said additional grids through said wave shaping networks.

References Cited in the file of this patent

UNITED STATES PATENTS

| | | |
|---|---|---|
| 2,282,526 | Moore | May 12, 1942 |
| 2,384,456 | Davey | Sept. 11, 1945 |
| 2,510,889 | Hollingsworth | June 6, 1950 |
| 2,619,587 | Trevor | Nov. 25, 1952 |
| 2,620,437 | Zeppacosta | Dec. 2, 1952 |
| 2,725,467 | Atwood | Nov. 29, 1955 |